(12) United States Patent
Kim et al.

(10) Patent No.: US 11,285,926 B2
(45) Date of Patent: Mar. 29, 2022

(54) FOLDABLE BRAKE PEDAL DEVICE FOR AUTONOMOUS VEHICLE

(71) Applicants: Hyundai Motor Company, Seoul (KR); Kia Motors Corporation, Seoul (KR); Kyung Chang Industrial Co., Ltd., Daegu (KR)

(72) Inventors: Eun Sik Kim, Gyeonggi-do (KR); Hyeon Uk Kim, Daegu (KR); Sung Il Byun, Daegu (KR)

(73) Assignees: Hyundai Motor Company, Seoul (KR); Kia Motors Corporation, Seoul (KR); Kyung Chang Industrial Co., Ltd., Daegu (KR)

( * ) Notice: Subject to any disclaimer, the term of this patent is extended or adjusted under 35 U.S.C. 154(b) by 0 days.

(21) Appl. No.: 16/995,387

(22) Filed: Aug. 17, 2020

(65) Prior Publication Data
US 2021/0284106 A1 Sep. 16, 2021

(30) Foreign Application Priority Data
Mar. 13, 2020 (KR) .......................... 10-2020-0031082

(51) Int. Cl.
*B60T 7/06* (2006.01)
*B60T 7/04* (2006.01)

(52) U.S. Cl.
CPC ................ *B60T 7/06* (2013.01); *B60T 7/042* (2013.01); *B60T 2270/82* (2013.01)

(58) Field of Classification Search
CPC ........ B60T 7/06; B60T 7/042; B60T 2270/82; B60T 2220/04; B60R 21/09; G05G 1/40; G05G 1/405
See application file for complete search history.

(56) References Cited

U.S. PATENT DOCUMENTS

| | | | | |
|---|---|---|---|---|
| 2,844,228 A | * | 7/1958 | Schnell | ................... B60T 13/52 |
| | | | | 188/357 |
| 5,996,439 A | * | 12/1999 | Elton | ...................... B60T 7/065 |
| | | | | 180/255 |
| 6,301,993 B1 | * | 10/2001 | Orr | ........................ B60K 23/02 |
| | | | | 74/512 |

FOREIGN PATENT DOCUMENTS

KR    10-2017-0137427 A    12/2017

* cited by examiner

*Primary Examiner* — Thomas C Diaz
(74) *Attorney, Agent, or Firm* — Mintz Levin Cohn Ferris Glovsky and Popeo, P.C.; Peter F. Corless

(57) ABSTRACT

A foldable brake pedal device for an autonomous vehicle is provided. In a manual driving mode, in which a driver directly operates a vehicle, the lower end of a brake pedal is popped up and exposed to the interior allowing the driver to manipulate the brake pedal. In an autonomous driving mode, in which the driver does not directly operate the vehicle, an actuator operates, and the brake pedal rotates causing the lower end thereof to move forward, and enter a hidden state to be prevented from being manipulated by the driver.

13 Claims, 10 Drawing Sheets

FIG. 8
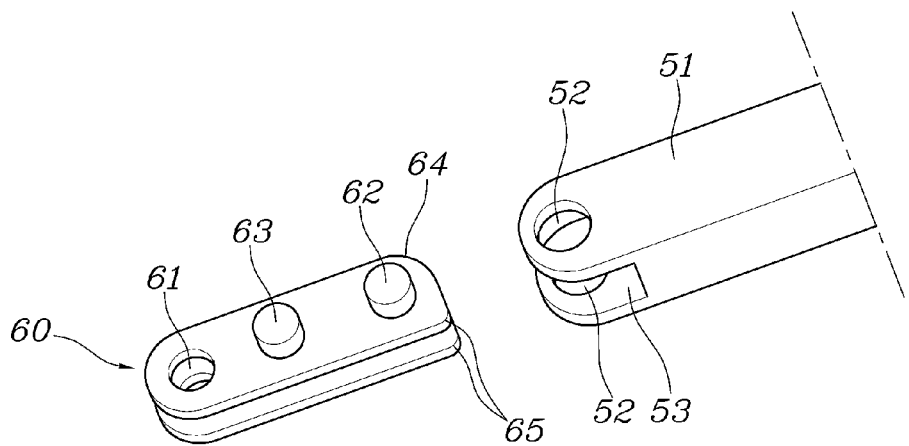
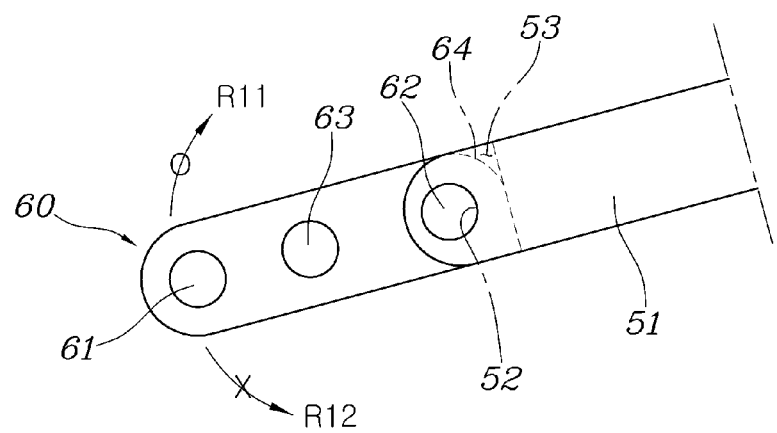

FOLDABLE BRAKE PEDAL DEVICE FOR AUTONOMOUS VEHICLE

CROSS-REFERENCE TO THE RELATED APPLICATION

This application claims priority from Korean Patent Application No. 10-2020-0031082, filed on Mar. 13, 2020, the disclosure of which is incorporated herein by reference in its entirety.

BACKGROUND

1. Field of the Disclosure

The present disclosure relates to a foldable brake pedal device for an autonomous vehicle, and more particularly to a foldable brake pedal device for an autonomous vehicle, which exposes a brake pedal to an interior to allow the brake pedal to be manipulated by a driver in a manual driving mode in which the driver directly operates the vehicle and prevents interior exposure of the brake pedal to prevent the brake pedal from being manipulated by the driver in an autonomous driving mode.

2. Description of the Related Art

An autonomous vehicle is a type of smart vehicle that employs an autonomous driving technology by which the vehicle is capable of being driven autonomously to a set destination by itself without manipulation of the steering wheel, the accelerator, the brake, or the like by a driver. These days, the development of such autonomous vehicles is accelerating.

To promote the commercialization thereof, autonomous vehicles enable selection between a manual driving mode, in which a driver directly operates the vehicle, and an autonomous driving mode, in which the vehicle autonomously travels to a destination without a driving operation by the driver. In the autonomous driving mode, a driver may desire to take a rest comfortably while stretching out. In this case, when pedals (e.g., an accelerator and a brake pedal) disposed in the space below the driver's seat remain exposed to the interior of vehicle, the pedals may disturb the driver causing unnecessary interference.

Further, in the autonomous driving mode, in which the driver does not need to manipulate the pedals (e.g., the accelerator and the brake pedal) of the vehicle, when the driver manipulates the pedals, the controller of the vehicle may be configured to determine that the driver intends to terminate the autonomous driving mode and to directly operate the vehicle, and terminate control for autonomous driving. However, since the pedals of the vehicle are mounted in the space below the driver's seat and thus exposed, the driver may unintentionally manipulate the pedals in the autonomous driving mode (e.g., the situation in which the pedals are erroneously manipulated), which may cause an accident depending on the road conditions, the distance between vehicles, or the like.

Therefore, there is the need for development of a novel pedal device for exposing a pedal to an interior to allow the pedal to be manipulated by a driver in a manual driving mode in which the driver directly operates the vehicle and preventing interior exposure of the pedal to prevent the pedal from being manipulated by the driver in an autonomous driving mode to prevent erroneous manipulation of the pedal and thus to secure the comfortable rest and safety of the driver.

The information disclosed in this section is merely for enhancement of understanding of the general background of the disclosure and should not be taken as an acknowledgement or any form of suggestion that this information forms the related art already known to a person skilled in the art.

SUMMARY

Therefore, the present disclosure provides a foldable brake pedal device for an autonomous vehicle, which exposes a brake pedal to an interior to allow the brake pedal to be manipulated by a driver in a manual driving mode in which the driver directly operates the vehicle and prevents interior exposure of the brake pedal to prevent the brake pedal from being manipulated by the driver in an autonomous driving mode in which the driver does not directly operate the vehicle, thereby preventing erroneous manipulation of the brake pedal and thus securing the comfortable rest and safety of the driver in the autonomous driving mode. It is another object of the present disclosure to provide a foldable brake pedal device for an autonomous vehicle, which sufficiently increases the strength and rigidity of a pedal member by minimizing the number of apertures formed in the pedal member.

In accordance with the present disclosure, the above and other objects can be accomplished by the provision of a foldable brake pedal device for an autonomous vehicle that may include a pedal member fixedly mounted in a space below the driver's seat and formed with a hinge bolt coupled thereto while penetrating left and right side surfaces thereof, a brake pedal mounted with an upper end thereof inserted into the pedal member to allow the hinge bolt to penetrate the upper end and the brake pedal may be configured to rotate forward and backwards about the hinge bolt, a connection link coupled at a first end thereof to the brake pedal via a clevis pin at a position below the hinge bolt and rotatably coupled at a second end (e.g., an opposite end) thereof to an end of a pedal push rod that is connected to a brake booster, an actuator disposed inside the pedal member and fixedly mounted to the pedal member, and a foldable link rotatably coupled at a first end thereof to a middle point of the connection link in a longitudinal direction and rotatably coupled at a second end (e.g., an opposite end) thereof to an end of the actuator.

The foldable brake pedal device may further include a return spring mounted to connect the pedal member to the brake pedal. When the brake pedal rotates forward as a driver engages the brake pedal, the return spring may be extended and may accumulate elastic force, and when a driver releases the brake pedal, the return spring may cause the brake pedal to rotate backwards and return to the initial position using the accumulated elastic force. The foldable brake pedal device may further include a pedal sensor fixed to one side surface of the pedal member and connected to the brake pedal via a mechanical structure. When the brake pedal rotates, the pedal sensor may be configured to detect a rotation angle of the brake pedal and generate a signal related to braking.

The pedal member may include bolt bores formed in the left and right side surfaces thereof to allow the hinge bolt to pass therethrough, and the bolt bores may be formed in the same shape as the cross-sectional shape of the hinge bolt, and may be formed in a perfectly circular shape. The connection link may extend in the longitudinal direction of the pedal push rod, the brake pedal may include a pedal aperture formed therein to allow the clevis pin to pass therethrough, and the pedal aperture may be formed as a slot that extends in the vertical direction in an elliptical shape such that the clevis pin is movable along the pedal aperture.

The actuator may include a straight-driving motor disposed between a connection line that connects the hinge bolt and the clevis pin and a movement route of the clevis pin and coupled to the pedal member to be disposed above the hinge bolt, and a plunger configured to move forward and backwards during operation of the straight-driving motor and rotatably coupled at an end thereof to the opposite end (e.g., second end) of the foldable link. The pedal aperture may be formed to extend between the connection line and the straight-driving motor, and may be formed to extend in a direction as close to the straight-driving motor as possible.

The connection link may include an intermediate protrusion formed between a first end and a second end thereof, the foldable link may include a link aperture formed in a first end thereof to allow the intermediate protrusion to be inserted thereinto, and the link aperture may be formed as a slot that extends in the longitudinal direction of the foldable link in an elliptical shape. The connection link may include an end protrusion formed at the opposite or second end thereof, the pedal push rod may include a rod aperture formed in an end thereof to allow the end protrusion to be rotatably coupled thereto, and when the connection link rotates about the end protrusion, the clevis pin, coupled to penetrate the first end of the connection link and the pedal aperture, may move along the pedal aperture or slot.

The connection link may include an upper corner disposed above the end protrusion and formed to be rounded, and a lower corner disposed below the end protrusion and formed to have a right angle. In the state in which the connection link extends straight in the longitudinal direction of the pedal push rod, the connection link may be rotatable only in a direction in which the upper corner is formed to be rounded, and may be prevented from rotating in the opposite direction, in which the lower corner is formed, by interference with the pedal push rod.

In an initial state in which the connection link and the pedal push rod extend straight, the plunger and the foldable link extend straight, and the clevis pin is disposed at the lower end of the pedal aperture, when a driver engages the brake pedal, the brake pedal may be configured to rotate forward about the hinge bolt. When the brake pedal rotates forward, the foldable link may be configured to rotate about the opposite or second end thereof, functioning as a connection point with the plunger, and the brake booster may be operated by forward movement of the connection link and the pedal push rod.

In an initial state in which the connection link and the pedal push rod extend straight, the plunger and the foldable link extend straight, and the clevis pin is disposed at the lower end of the pedal aperture, when the actuator operates and the foldable link is thus pulled, the connection link may move upwards to cause the first end to rotate about the second end thereof, functioning as a connection point with the pedal push rod, the clevis pin may move along the pedal aperture to the upper end of the pedal aperture, and the brake pedal may be configured to rotate about the hinge bolt to cause the lower end thereof to move forward, and the brake pedal may enter a hidden state in which exposure thereof to the interior is prevented.

In the hidden state, when the actuator operates and the foldable link is thus pushed downwards, the connection link may move downwards to cause the first end thereof to rotate about the opposite or second end thereof, functioning as a connection point with the pedal push rod, the connection link and the pedal push rod may be connected straight to each other, the clevis pin may move along the pedal aperture from the upper end to the lower end of the pedal aperture, and the brake pedal may be configured to rotate about the hinge bolt to cause the lower end thereof to move backwards, and the brake pedal may enter a popped-up state in which the brake pedal is exposed to the interior.

BRIEF DESCRIPTION OF THE DRAWINGS

The above and other objects, features and other advantages of the present disclosure will be more clearly understood from the following detailed description taken in conjunction with the accompanying drawings, in which:

FIG. 8 illustrates an exploded perspective view of a connection link and a pedal push rod and a side view showing the coupling structure thereof according to an exemplary embodiment of the present disclosure;

DETAILED DESCRIPTION

Figure 1:
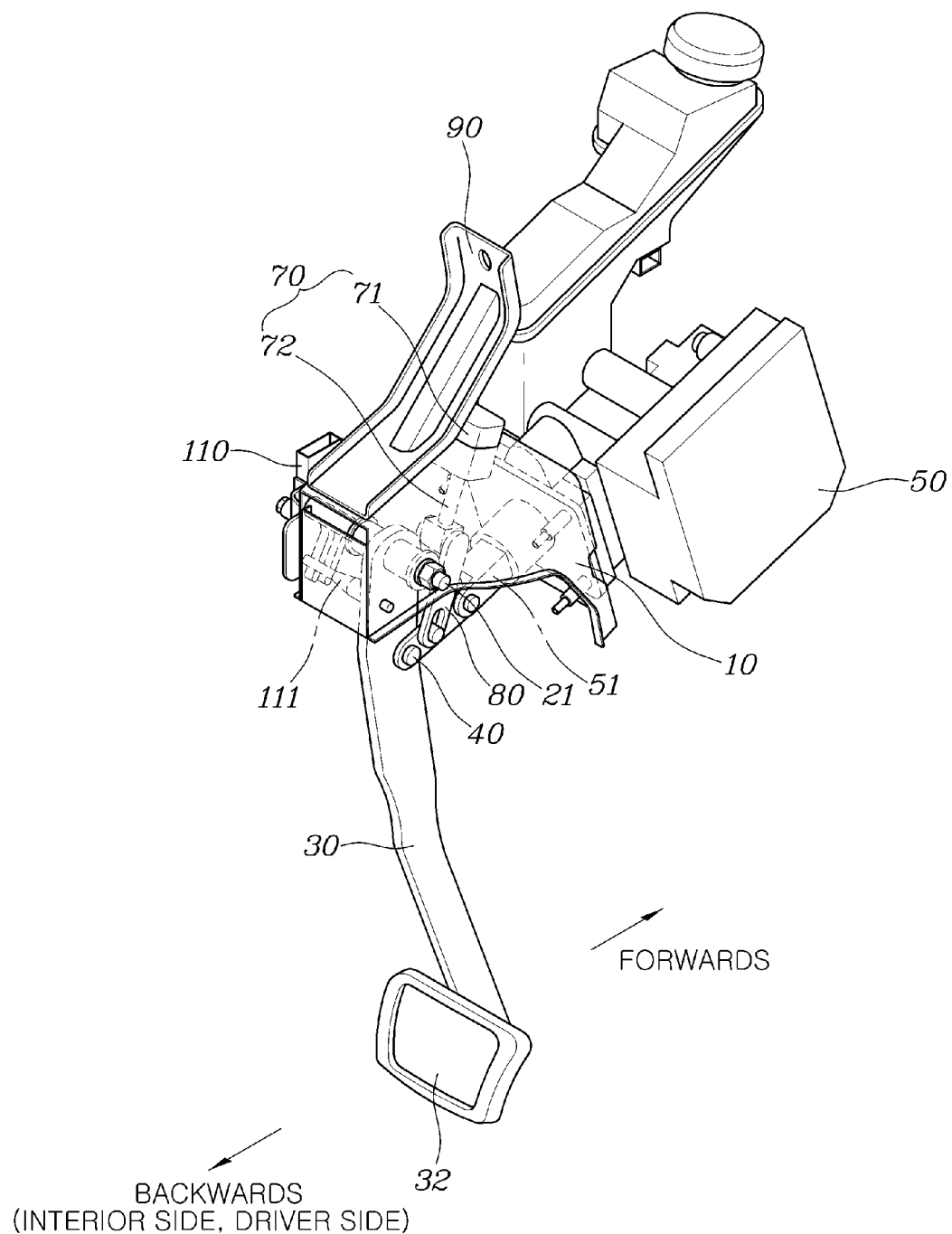
FIGS. 1 to 3 are, respectively, a perspective view, a front view, and a side view of a foldable brake pedal device for an autonomous vehicle according to an exemplary embodiment of the present disclosure.
Figure 2:
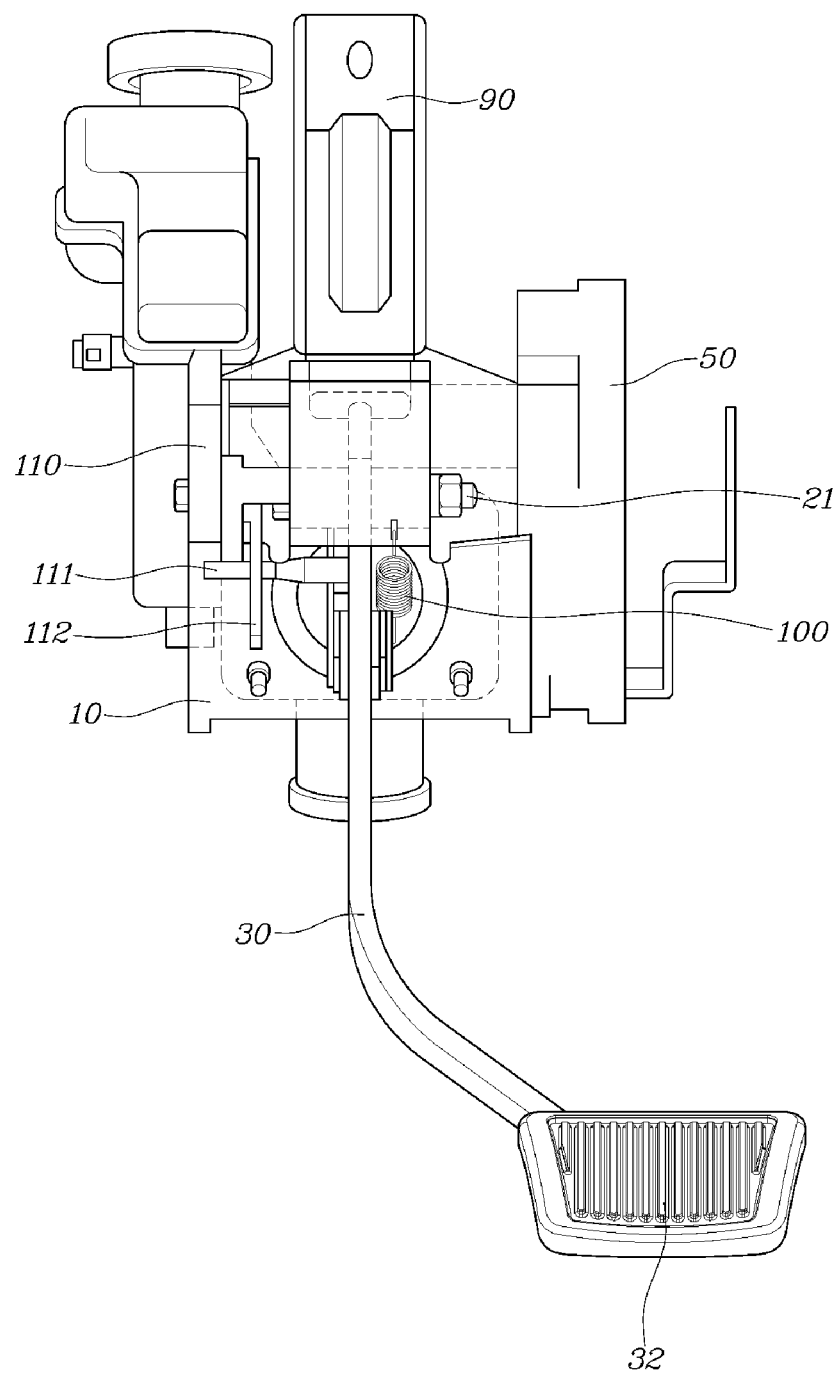
Figure 3:
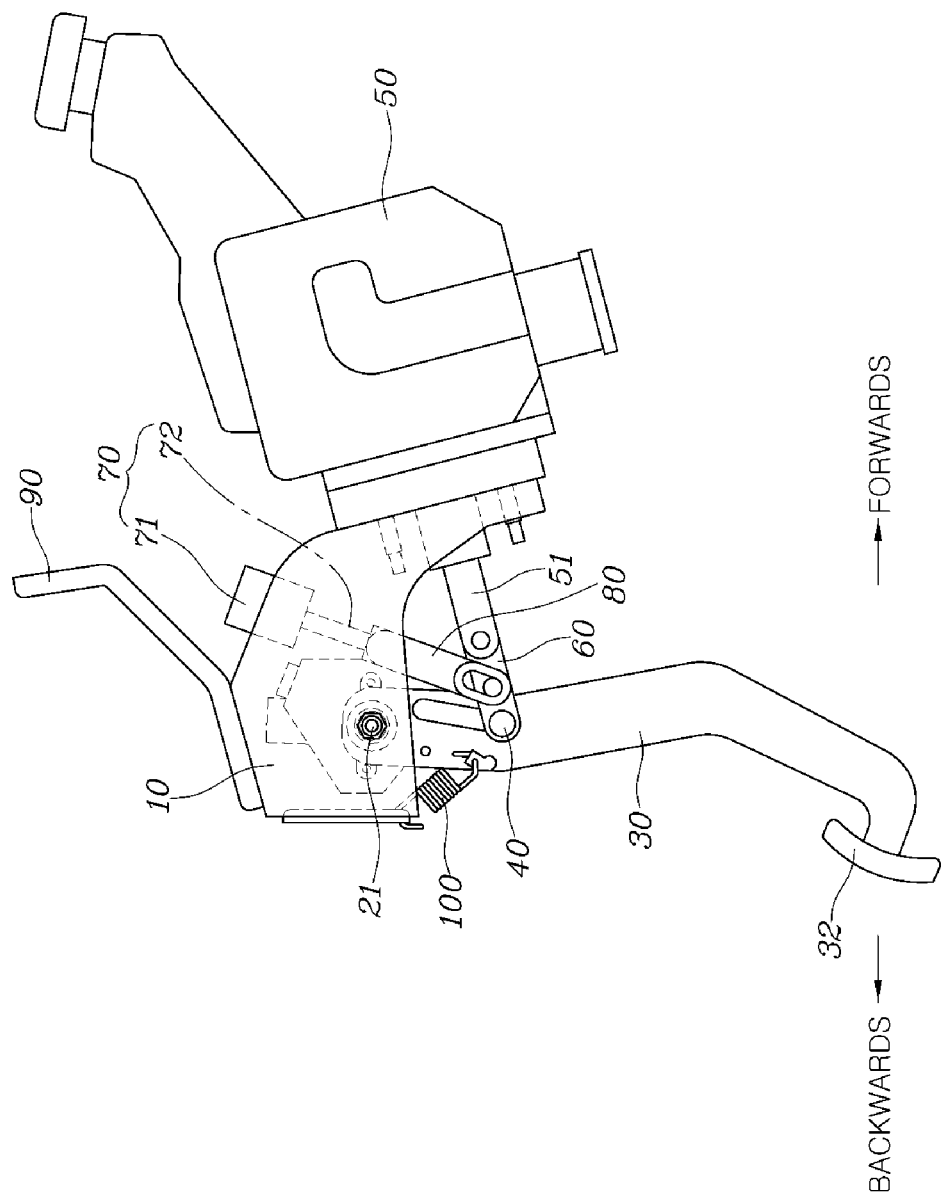
Figure 4:
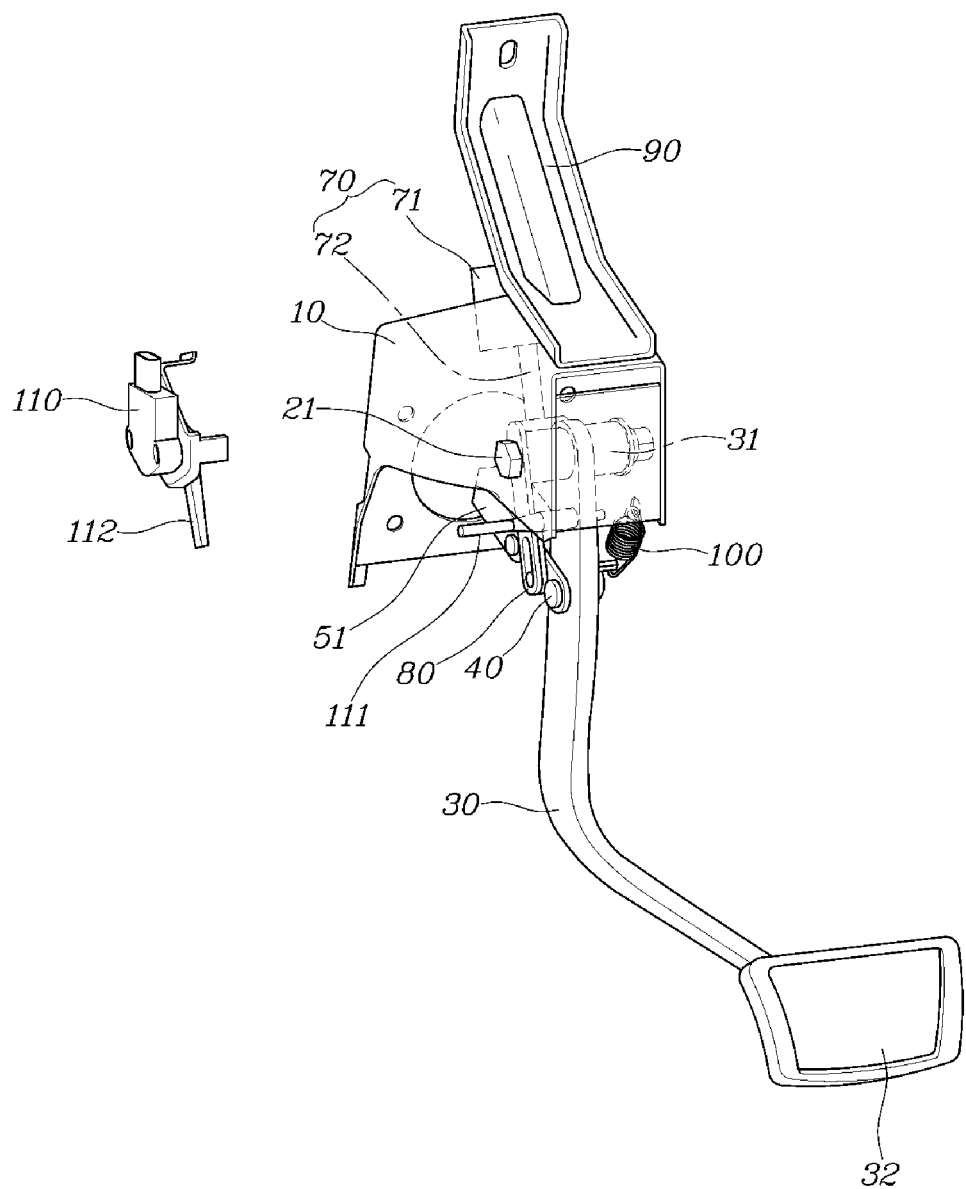
FIG. 4 is a perspective view of the foldable brake pedal device and a pedal sensor separated therefrom according to an exemplary embodiment of the present disclosure.
Figure 5:
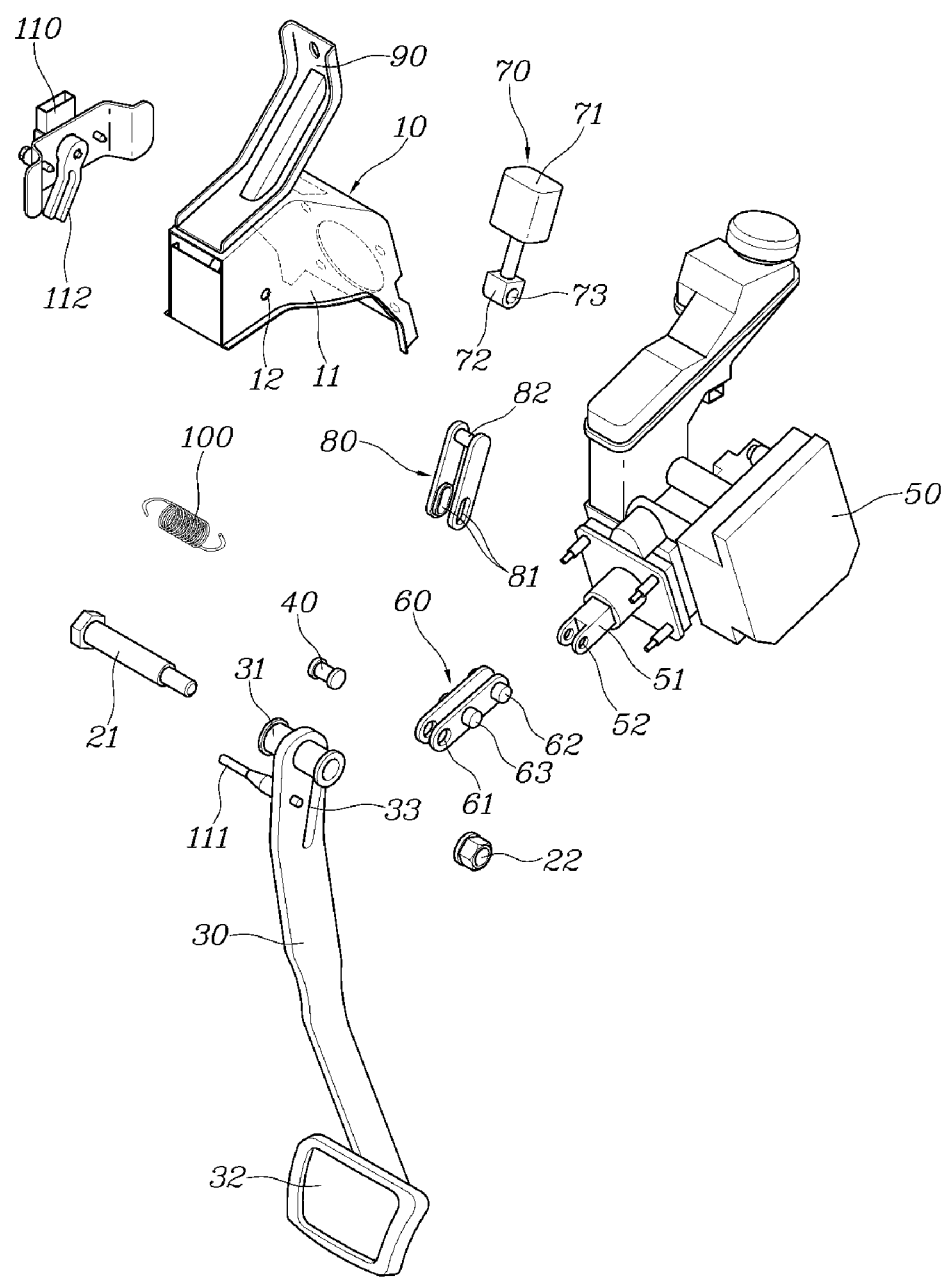
FIG. 5 is an exploded perspective view of the foldable brake pedal device for an autonomous vehicle according to an exemplary embodiment of the present disclosure.
Figure 6:
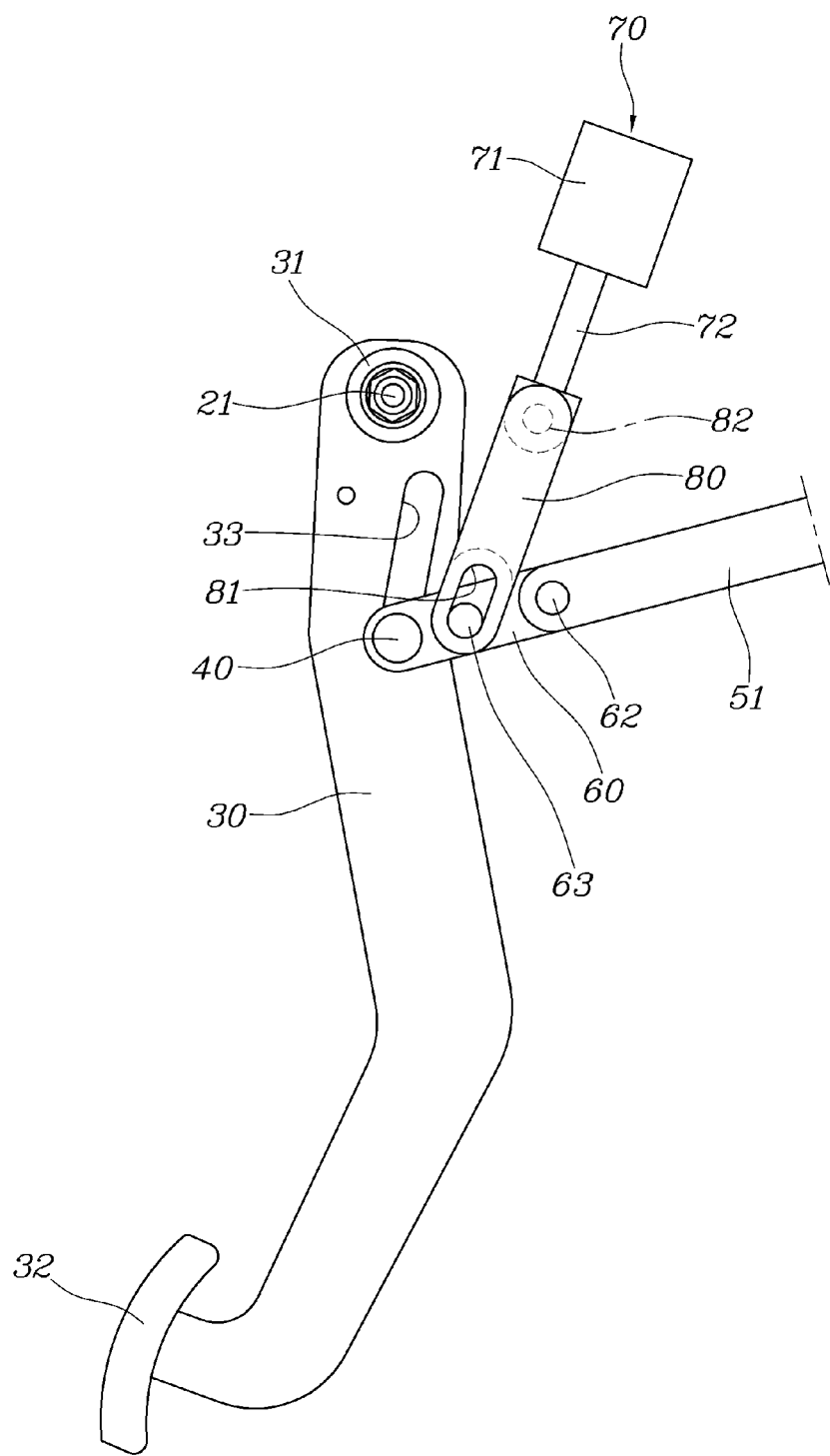
FIG. 6 is a side view showing the coupling structure of a brake pedal, a connection link, and a foldable link according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a foldable brake pedal device for an autonomous vehicle according to exemplary embodiments of the present disclosure will be described with reference to the accompanying drawings.

As shown in FIGS. 1 to 10, a foldable brake pedal device for an autonomous vehicle according to the present disclosure may include a pedal member 10, fixedly mounted in the space below the driver's seat and to which a hinge bolt 21 may be coupled while penetrating left and right side surfaces 11 thereof, a brake pedal 30, mounted with the upper end thereof inserted into the pedal member 10 to allow the hinge bolt 21 to penetrate the upper end and to cause the brake pedal 30 to rotate forward and backwards about the hinge bolt 21, a connection link 60, coupled at a first end thereof to the brake pedal 30 via a clevis pin 40 at a position below the hinge bolt and rotatably coupled at an opposite or second end thereof to the end of a pedal push rod 51 that is connected to a brake booster 50, an actuator 70, disposed inside the pedal member 10 and fixedly mounted to the pedal member 10, and a foldable link 80, rotatably coupled at a first end thereof to a middle point of the connection link 60 in a longitudinal direction and rotatably coupled at an opposite or second end thereof to the end of the actuator 70.

The pedal member 10 may include two left and right side surfaces 11 disposed parallel to each other. The front sides, the top sides, and the rear sides of the left and right side surfaces 11 may be connected via a front surface, a top surface, and a rear surface, respectively. The pedal member 10 may have an open bottom. The front surface of the pedal member 10 may be fixedly coupled to a dash panel, which forms the vehicle body. A cowl bracket 90 may be coupled to the top surface of the pedal member 10. The cowl bracket 90 may have a structure coupled to a cowl panel.

The pedal member 10 according to the present disclosure may include only bolt bores 12 formed in the left and right side surfaces 11, through which only the hinge bolt 21 may pass. Accordingly, the number of apertures formed in the side surfaces 11 of the pedal member 10 may be minimized, thereby sufficiently increasing the strength and rigidity of the pedal member 10. To secure the strength and rigidity of the pedal member 10, the bolt apertures 12 formed in the left and right side surfaces 11 of the pedal member 10 may be formed in a substantially perfectly circular shape, which is the same as the cross-sectional shape of the hinge bolt 21.

The exemplary embodiment according to the present disclosure may further include a return spring 100 mounted to connect the pedal member 10 to the brake pedal 30. When the brake pedal 30 rotates forward about the hinge bolt 21 as the driver engages the brake pedal 30, the return spring 100 is extended and accumulates elastic force. When the driver releases the brake pedal 30, the return spring 100 causes the brake pedal 30 to rotate backwards and return to the initial position using the accumulated elastic force.

The return spring 100 may be a compression coil spring, but the disclosure is not limited thereto. In addition, the exemplary embodiment according to the present disclosure may further include a pedal sensor 110, fixed to one side surface of the pedal member 10 and connected to the brake pedal 30 via a mechanical structure. A connection pin 111 may be coupled to the brake pedal 30 to protrude from one side of the brake pedal 30. The pedal sensor 110 may include a rotary lever 112. The connection pin 111 and the rotary lever 112 may be connected to each other.

Therefore, when the brake pedal 30 rotates about the hinge bolt 21, the connection pin 111 and the rotary lever 112 may also be rotated therewith. In addition, a permanent magnet may be coupled to the rotary lever 112, and a printed circuit board (PCB) may be provided inside the pedal sensor 110 to face the permanent magnet. The PCB may be electrically connected to a power source device such as a battery via a wire.

Accordingly, when the brake pedal 30 rotates as the driver engages the brake pedal 30, the connection pin 111 and the rotary lever 112 may also be rotated therewith. During the rotation of the rotary lever 112, the position of the permanent magnet coupled to the rotary lever 112 changes, and the PCB may be configured to detect the rotation angle of the brake pedal 30 through a change in the intensity of a magnetic field due to the change in the rotational position of the permanent magnet and generate a signal related to braking.

The pedal sensor 110 according to the exemplary embodiment of the present disclosure may be a contact-type pedal sensor in which the connection pin 111 and the rotary lever 112 are connected to each other. However, the pedal sensor 110 may be configured as a non-contact-type pedal sensor, including only a permanent magnet and a PCB, as needed. Further, a hinge pipe 31 may be coupled to the upper end of the brake pedal 30 to penetrate the same in the lateral direction. The hinge pipe 31 may be received in the pedal member 10, and the hinge bolt 21 may penetrate the bolt bores 12, each formed in the left and right side surfaces 11 of the pedal member 10, and the hinge pipe 31 and may be coupled to a nut 22. Accordingly, the brake pedal 30 may be configured to rotate in the forward-backward direction about the hinge bolt 21.

The brake pedal 30 may be at the lower end thereof with a pad 32 that the driver steps on. The connection link 60 according to the present disclosure may extend in the longitudinal direction of the pedal push rod 51. The brake pedal 30 may include a pedal aperture 33 formed therein, through which the clevis pin 40 may pass. The pedal aperture 33 may be formed as a slot, which extends in the vertical direction in an elliptical shape. Thus, the clevis pin 40 may move along the pedal aperture 33 in the state of penetrating the pedal aperture 33.

The connection link 60 may include two plates, which have a straight or linear shape, may be spaced apart from each other in the lateral direction, and may be arranged parallel to each other such that the two ends thereof are oriented in the forward-backward direction. An end aperture 61 may be formed in a first end of the connection link 60, coupled to the brake pedal 30, and the clevis pin 40 may be mounted to penetrate the end aperture 61 and the pedal aperture 33.

The end aperture 61 may be formed in a substantially perfectly circular shape, which is the same as the cross-sectional shape of the clevis pin 40. An end protrusion 62 may be formed at the opposite or second end of the connection link 60, coupled to the pedal push rod 51. A rod aperture 52 may be formed at the end of the pedal push rod 51, into which the end protrusion 62 may be rotatably inserted. A concave recess 53 having a concave shape may be formed in the end of the pedal push rod 51. Additionally, the rod aperture 52 may be formed in each of two left and right side portions of the pedal push rod 51, which form the concave recess 53. The rod aperture 52 may be formed in a circular shape, which is the same as the cross-sectional shape of the end protrusion 62.

The opposite or second end of the connection link 60 may be inserted into the concave recess 53 formed in the end of the pedal push rod 51. The end protrusion 62 formed at the opposite or second end of the connection link 60 may penetrate the rod aperture 52 and may be rotatably coupled to the pedal push rod 51. The clevis pin 40 may be mounted to penetrate the end aperture 61 formed in a first end of the connection link 60 and the pedal aperture 33 formed in the brake pedal 30. Therefore, when the connection link 60 rotates about the end protrusion 62, the clevis pin 40, coupled to penetrate the end aperture 61 formed in a first end of the connection link 60 and the pedal aperture 33, may move along the pedal aperture 33.

When the opposite or second end of the connection link 60 is inserted into the concave recess 53 formed in the end of the pedal push rod 51 and the end protrusion 62 formed at the opposite or second end of the connection link 60 penetrates the rod aperture 52, the connection link 60 may be configured to rotate relative to the pedal push rod 51 about the end protrusion 62. An upper corner 64 of the connection link 60, disposed above the end protrusion 62, may be formed to be rounded, and a lower corner 65 of the connection link 60, disposed below the end protrusion 62, may be formed to have a right angle.

Thus, as shown in the lower view in FIG. 8, in the state in which the connection link 60 extends straight in the longitudinal direction of the pedal push rod 51, the connection link 60 may be configured to rotate only in one direction, that is, the direction in which the upper corner 64 is formed (e.g., only in the direction indicated by the arrow R11) due to the rounded shape of the upper corner 64, but is not capable of rotating in the opposite direction, in which the lower corner 65 is formed (e.g., in the direction indicated by the arrow R12), due to the interference between the lower corner 65 and the pedal push rod 51.

An intermediate protrusion 63 may be formed at the middle point of the connection link 60 in the longitudinal direction (e.g., between a first end of the connection link 60 and a second end thereof or between the end aperture 61 in the connection link 60 and the end protrusion 62 thereof). The intermediate protrusion 63 may be coupled to a first end of the foldable link 80. The foldable link 80 may include two plates having a straight shape, may be spaced apart from each other in the lateral direction, and may be arranged parallel to each other such that the two ends thereof are oriented in the vertical direction. A link aperture 81 may be formed in the first end of the foldable link 80, which is oriented downwards, and the intermediate protrusion 63 of the connection link 60 may be inserted into the link aperture 81.

A connection rod 82 may be formed at a second or opposite end of the foldable link 80, which is oriented upwards, to connect the two plates. The connection rod 82 may be rotatably coupled to a plunger 72 that forms the actuator 70. The link aperture 81 formed in the first end of the foldable link 80 may be formed as a slot, which extends in the longitudinal direction of the foldable link 80 in an elliptical shape.

Figure 9:
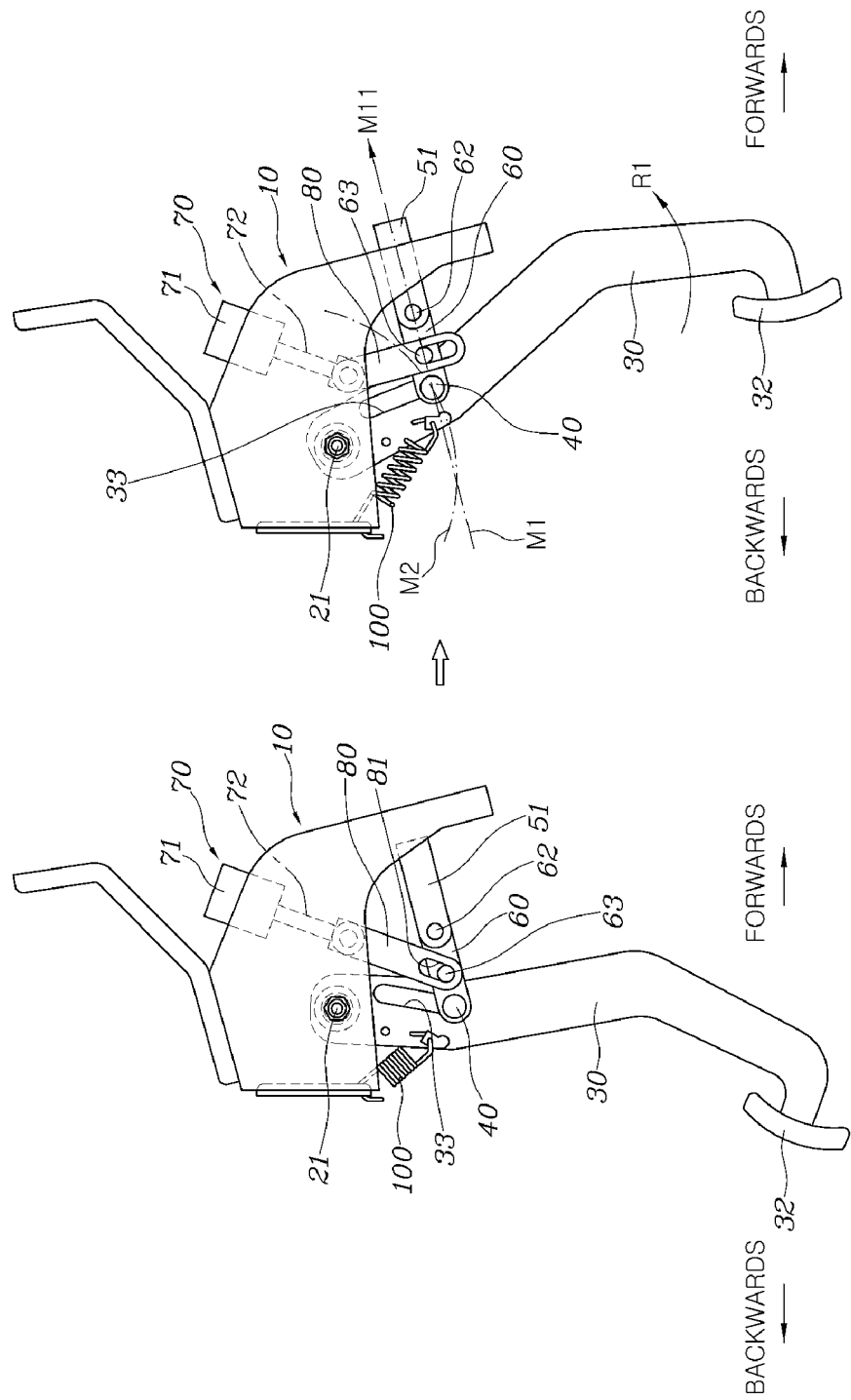
FIG. 9 is a view illustrating the normal operation state of the brake pedal according to an exemplary embodiment of the present disclosure.

In other words, referring to FIG. 9, when the brake pedal 30 rotates about the hinge bolt 21 as the driver engages the brake pedal 30, the pedal push rod 51 may move forward along a straight route M1, and the clevis pin 40 may move along a rotary route M2 about the hinge bolt 21. Therefore, to simultaneously allow movement of the intermediate protrusion 63 along the straight route M1 and the rotary route M2, the link aperture 81 may be formed as a slot that extends in the longitudinal direction of the foldable link 80 in an elliptical shape.

Figure 7:
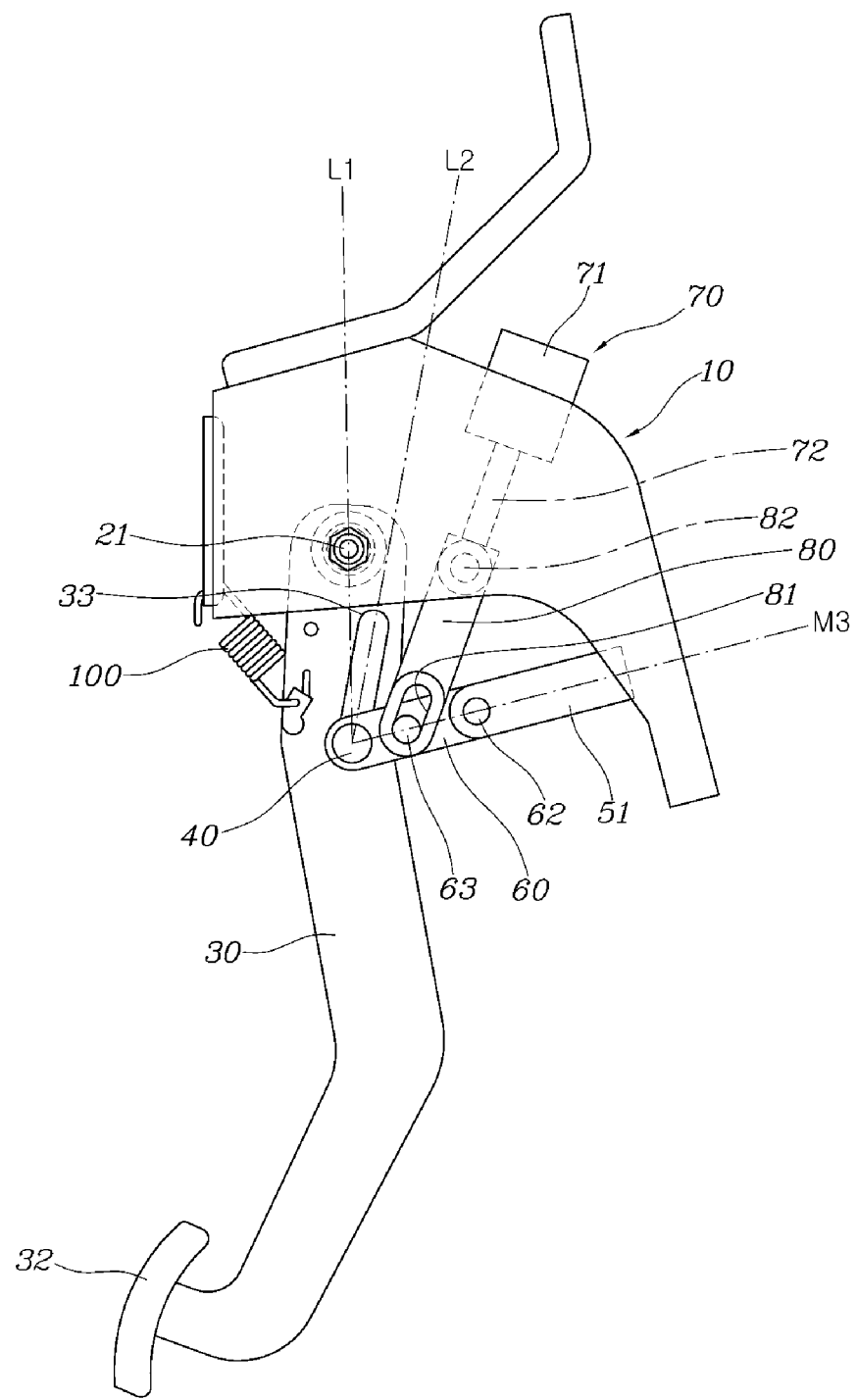
FIG. 7 is a view of the foldable brake pedal device of FIG. 3 from which a brake booster is removed to illustrate a pedal aperture formed in the brake pedal according to an exemplary embodiment of the present disclosure.

As shown in FIG. 7, the actuator 70 may include a straight-driving motor 71 disposed between a connection line L1 connecting the hinge bolt 21 and the clevis pin 40 and a movement route M3 of the clevis pin 40 and may be coupled to the pedal member 10 to be disposed above the hinge bolt 21, and a plunger 72, which moves forward and backwards during the operation of the straight-driving motor 71 and may be rotatably coupled at the end thereof to the second end of the foldable link 80. The straight-driving motor 71 may be implemented as a linear motor. A plunger aperture 73, which has a circular shape, may be formed in the end of the plunger 72. The connection rod 82 formed at the second end of the foldable link 80 may pass through the plunger aperture 73.

As described above, the pedal aperture 33 formed in the brake pedal 30 may be formed as a slot that extends in the vertical direction in an elliptical shape to allow movement of the clevis pin 40. To maximize the distance that the brake pedal 30 is capable of rotating forward during operation of the actuator 70, the pedal aperture 33 may be formed to extend between the connection line L1 and the straight-driving motor 71 (refer to line L2). Preferably, the pedal aperture 33 may be formed to extend in a direction as close to the straight-driving motor 71 as possible.

The view located at the left side of FIG. 9 shows the initial state, in which the driver does not engage the brake pedal 30 and in which the straight-driving motor 71 does not operate. In the initial state, the connection link 60 and the pedal push rod 51 extend straight, the plunger 72 and the foldable link 80 also extend straight, the clevis pin 40 is disposed at the lower end of the pedal aperture 33, and the intermediate protrusion 63 is disposed at the lower end of the link aperture 81.

In this initial state, when the driver engages the pad 32 of the brake pedal 30, as shown in the view located at the right side of FIG. 9, the brake pedal 30 may be configured to rotate forward about the hinge bolt 21 (as indicated by the arrow R1). When the brake pedal 30 rotates forward, the connection link 60 and the pedal push rod 51 move forward (M11), the foldable link 80 rotates about the second end thereof (the connection rod 82), which is the connection point with the plunger 72, the intermediate protrusion 63 of the connection link 60 moves along the link aperture 81 from the lower end to the upper end of the link aperture 81, and the brake booster 50 may be operated by the forward movement (M11) of the connection link 61 and the pedal push rod 51, thereby generating hydraulic pressure required for braking.

When the driver engages the brake pedal 30, the connection pin 111 and the rotary lever 112 may be configured to rotate together. When the rotary lever 112 rotates, the pedal sensor 110 may be configured to detect the rotation angle of the brake pedal 30 through a change in the intensity of a magnetic field due to the change in the rotational position of the permanent magnet coupled to the rotary lever 112 and may be configured to generate a signal related to braking, whereby the vehicle is capable of performing normal braking. The view located at the left side of FIG. 10 shows the initial state, in which the driver does not engage the brake pedal 30 and in which the straight-driving motor 71 does not operate.

Figure 10:
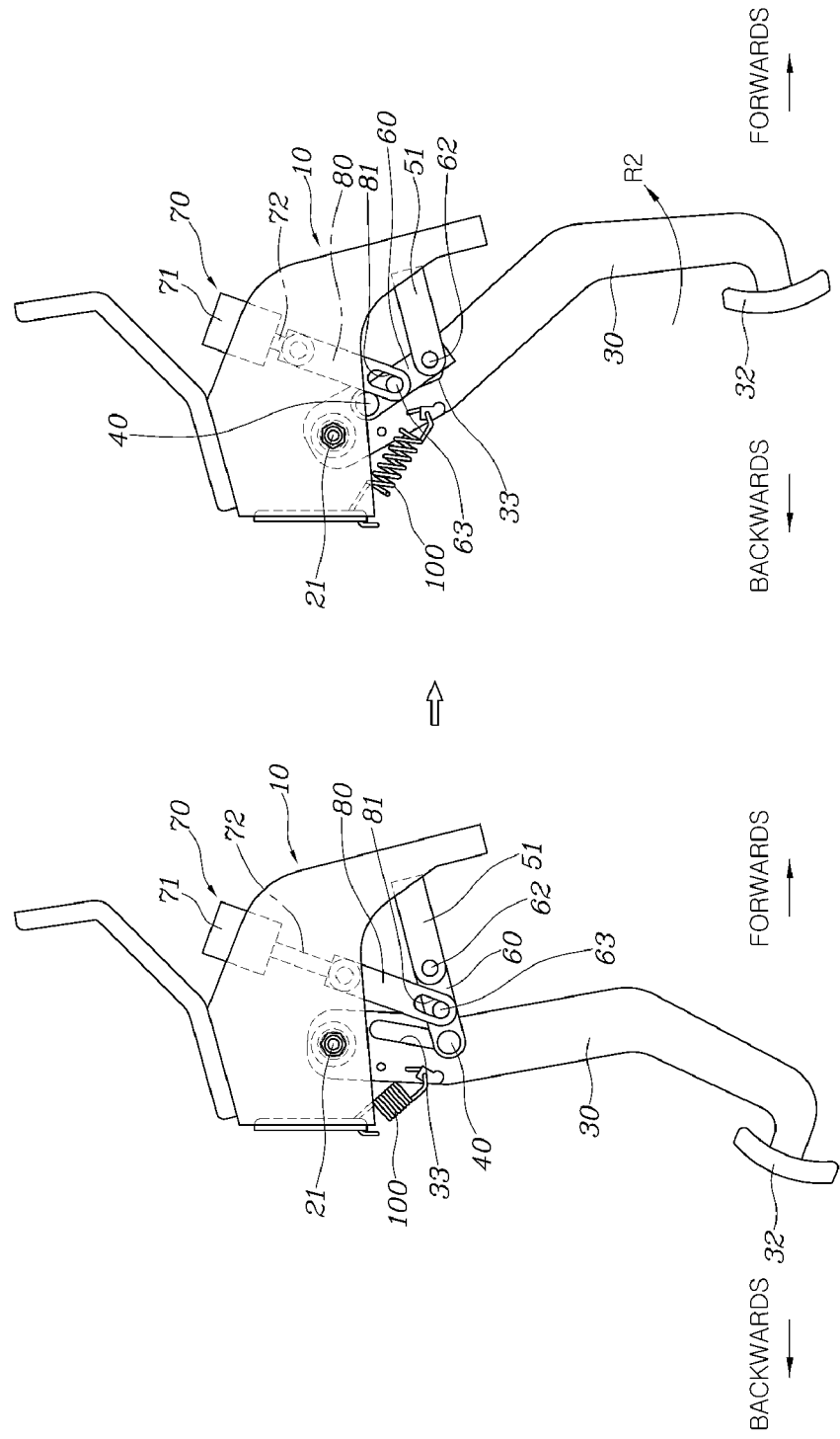
FIG. 10 is a view illustrating a popped-up state in which the lower end of the brake pedal is exposed to the interior and a hidden state in which the lower end of the brake pedal is rotated forward.

In this initial state, as shown in the view located at the right side of FIG. 10, when the straight-driving motor 91 operates and the plunger 72 is thus pulled upwards, the connection link 60 may move upwards to rotate the first end thereof that is coupled to the brake pedal 30 about the second end thereof (the end protrusion 62), which is the connection point with the pedal push rod 51, the clevis pin 40 may move along the pedal aperture 33 from the lower end to the upper end of the pedal aperture 33, and the brake pedal 30 may be configured to rotate about the hinge bolt 21 to cause the lower end thereof to move forward, and thus enter a hidden state in which exposure thereof to the interior is prevented (as indicated by the arrow R2).

When the brake pedal 30 is in the hidden state, the space below the driver's seat becomes broad, and thus the driver is capable of taking a rest comfortably in a relaxation mode without interference of the brake pedal. Conversely, as shown in the view located at the right side of FIG. 10, in the hidden state, in which the lower end of the brake pedal 30 is rotated forward and interior exposure thereof is thus prevented, when the straight-driving motor 71 operates and thus the plunger 72 protrudes downwards, the foldable link 80 is pushed downwards, and the connection link 60 moves downwards causing the first end thereof to rotate about the second end thereof (the end protrusion 62), which is the connection point with the pedal push rod 51. Accordingly, the connection link 60 and the pedal push rod 51 may be connected straight to each other, the clevis pin 40 may move along the pedal aperture 33 from the upper end to the lower end thereof, and the brake pedal 30 may be configured to rotate about the hinge bolt 21 to cause the lower end thereof to move backwards, and thus enter a popped-up state in which the brake pedal protrudes to the interior.

As is apparent from the above description, according to the foldable brake pedal device for an autonomous vehicle of the present disclosure, in a manual driving mode, in which the driver directly operates the vehicle, the lower end of the brake pedal 30 may be popped up and exposed to the interior to allow the driver to manipulate the brake pedal 30, and in an autonomous driving mode, in which the driver does not directly operate the vehicle, the actuator 70 may be configured to operate and the brake pedal 30 may be configured to rotate to cause the lower end thereof to move forward, and enter a hidden state to be prevented from being manipulated by the driver. As a result, the driver is capable of taking a rest comfortably in the autonomous driving mode. Further, it may be possible to secure safety by preventing erroneous manipulation of the brake pedal 30 in the autonomous driving mode.

In addition, according to the exemplary embodiment of the present disclosure, only the bolt bores 12, through which the hinge bolt 21 passes, are formed in the side surfaces 11 of the pedal member 10. Accordingly, since the number of apertures formed in the side surfaces 11 of the pedal member 10 is minimized, it may be possible to sufficiently increase the strength and rigidity of the pedal member 10.

Although exemplary embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A foldable brake pedal device for an autonomous vehicle, comprising:
    a pedal member fixedly mounted in a space below a driver seat, the pedal member being formed with a hinge bolt coupled thereto while penetrating left and right side surfaces thereof;
    a brake pedal mounted with an upper end thereof inserted into the pedal member to allow the hinge bolt to penetrate the upper end and the brake pedal is configured to rotate forward and backwards about the hinge bolt;
    a connection link coupled at a first end thereof to the brake pedal via a clevis pin at a position below the hinge bolt and rotatably coupled at a second end thereof to an end of a pedal push rod that is connected to a brake booster;
    an actuator disposed inside the pedal member and fixedly mounted to the pedal member; and
    a foldable link rotatably coupled at a first end thereof to a middle point of the connection link in a longitudinal direction and rotatably coupled at a second end thereof to an end of the actuator.

2. The foldable brake pedal device according to claim 1, further comprising:
    a return spring mounted to connect the pedal member to the brake pedal,
    wherein, when the brake pedal rotates forward as the brake pedal is engaged, the return spring is extended and accumulates elastic force, and
    wherein, when the brake pedal is released, the return spring causes the brake pedal to rotate backwards and return to an initial position using accumulated elastic force.

3. The foldable brake pedal device according to claim 1, further comprising:
    a pedal sensor fixed to one side surface of the pedal member and connected to the brake pedal via a mechanical structure,
    wherein, when the brake pedal rotates, the pedal sensor is configured to detect a rotation angle of the brake pedal and generate a signal related to braking.

4. The foldable brake pedal device according to claim 1, wherein the pedal member includes:
    bolt bores formed in the left and right side surfaces thereof to allow the hinge bolt to pass therethrough,
    wherein the bolt bores are formed in a same shape as a cross-sectional shape of the hinge bolt, and are formed in a circular shape.

5. The foldable brake pedal device according to claim 1, wherein the connection link extends in a longitudinal direction of the pedal push rod, wherein the brake pedal includes a pedal aperture formed therein to allow the clevis pin to pass therethrough, and wherein the pedal aperture is formed as a slot extending in a vertical direction in an elliptical shape and the clevis pin is movable along the pedal aperture.

6. The foldable brake pedal device according to claim 5, wherein the actuator includes:
- a straight-driving motor disposed between a connection line connecting the hinge bolt and the clevis pin and a movement route of the clevis pin, the straight-driving motor being coupled to the pedal member to be disposed above the hinge bolt; and
- a plunger configured to move forward and backwards during operation of the straight-driving motor, the plunger being rotatably coupled at an end thereof to the second end of the foldable link.

7. The foldable brake pedal device according to claim 6, wherein the pedal aperture is formed to extend between the connection line and the straight-driving motor, and is formed to extend in a direction inclined with respect to the connection line.

8. The foldable brake pedal device according to claim 1, wherein the connection link includes:
- an intermediate protrusion formed between a first end and a second end of the connection link,
- wherein the foldable link includes a link aperture formed in the first end thereof to allow the intermediate protrusion to be inserted thereinto, and
- wherein the link aperture is formed as a slot extending in a longitudinal direction of the foldable link in an elliptical shape.

9. The foldable brake pedal device according to claim 5, wherein the connection link includes:
- an end protrusion formed at the second end of the connection link,
- wherein the pedal push rod includes a rod aperture formed in an end of the pedal push rod to allow the end protrusion to be rotatably coupled thereto, and
- wherein, when the connection link rotates about the end protrusion, the clevis pin, coupled to penetrate the first end of the connection link and the pedal aperture, moves along the pedal aperture.

10. The foldable brake pedal device according to claim 9, wherein the connection link includes
- an upper corner located above the end protrusion and formed to be rounded, and a lower corner disposed below the end protrusion and formed to have a right angle, and
- wherein, in a state in which the connection link extends straight in a longitudinal direction of the pedal push rod, the connection link is rotatable in a direction in which the upper corner is formed to be rounded, and is prevented from rotating in an opposite direction, in which the lower corner is formed, by interference with the pedal push rod.

11. The foldable brake pedal device according to claim 6, wherein:
- in an initial state in which the connection link and the pedal push rod extend straight, the plunger and the foldable link extend straight, and the clevis pin is disposed at a lower end of the pedal aperture, when the brake pedal is engaged, the brake pedal rotates forward about the hinge bolt, and
- when the brake pedal rotates forward, the foldable link rotates about the second end thereof, functioning as a connection point with the plunger, and the brake booster is operated by forward movement of the connection link and the pedal push rod.

12. The foldable brake pedal device according to claim 6, wherein, in an initial state in which the connection link and the pedal push rod extend straight, the plunger and the foldable link extend straight, and the clevis pin is disposed at a lower end of the pedal aperture, when the actuator operates and the foldable link is thus pulled, the connection link moves upwards such that the first end thereof rotates about the opposite end thereof, functioning as a connection point with the pedal push rod, the clevis pin moves along the pedal aperture to an upper end of the pedal aperture, and the brake pedal rotates about the hinge bolt causing a lower end thereof to move forward, and enters a hidden state in which exposure thereof to an interior is prevented.

13. The foldable brake pedal device according to claim 12, wherein, in the hidden state, when the actuator operates and the foldable link is thus pushed downwards, the connection link moves downwards to cause the first end thereof to rotate about the opposite end thereof, functioning as a connection point with the pedal push rod, the connection link and the pedal push rod are connected straight to each other, the clevis pin moves along the pedal aperture from an upper end to a lower end of the pedal aperture, and the brake pedal rotates about the hinge bolt such that a lower end thereof moves backwards, and enters a popped-up state in which the brake pedal is exposed to an interior.

* * * * *